Jan. 31, 1956     E. J. KLEPPE     2,732,785
ROTARY BLADE CULTIVATOR
Filed April 17, 1951     3 Sheets-Sheet 1
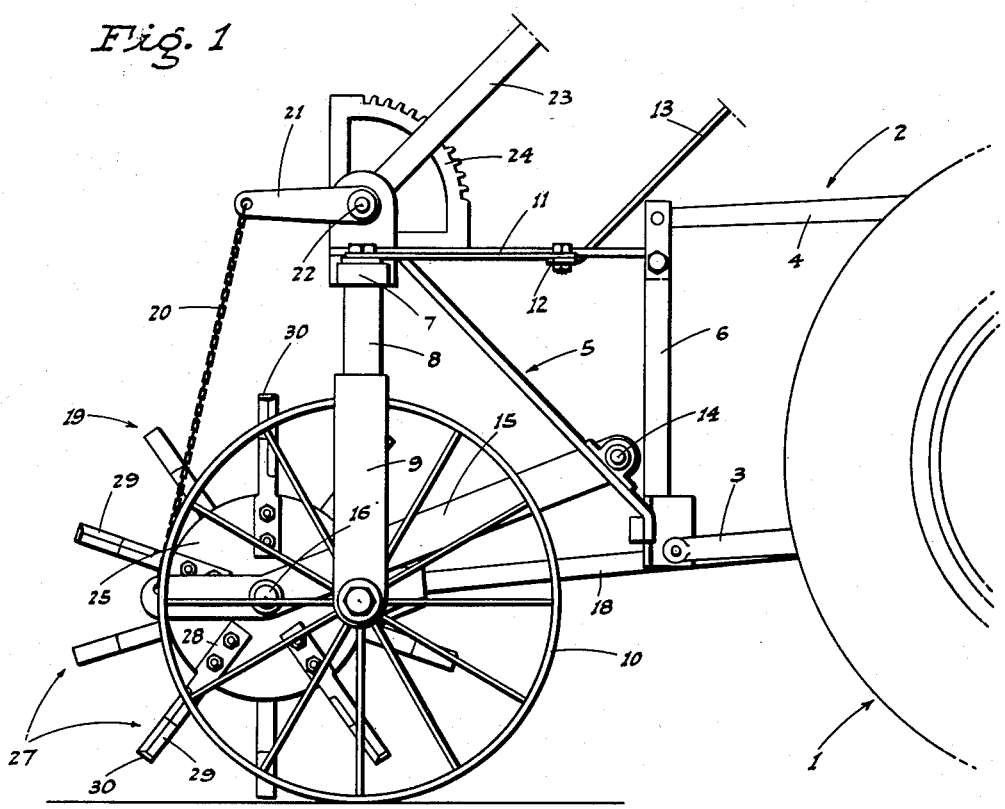
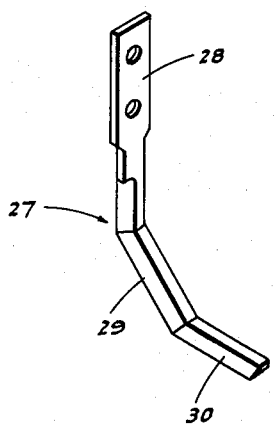 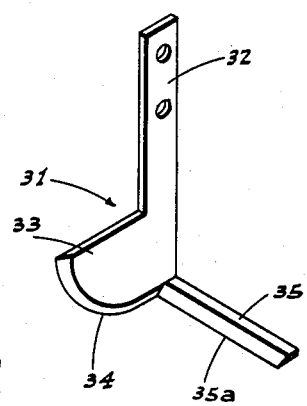 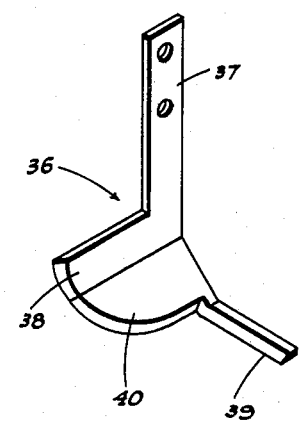
INVENTOR
Ernest J. Kleppe
BY
ATTORNEYS

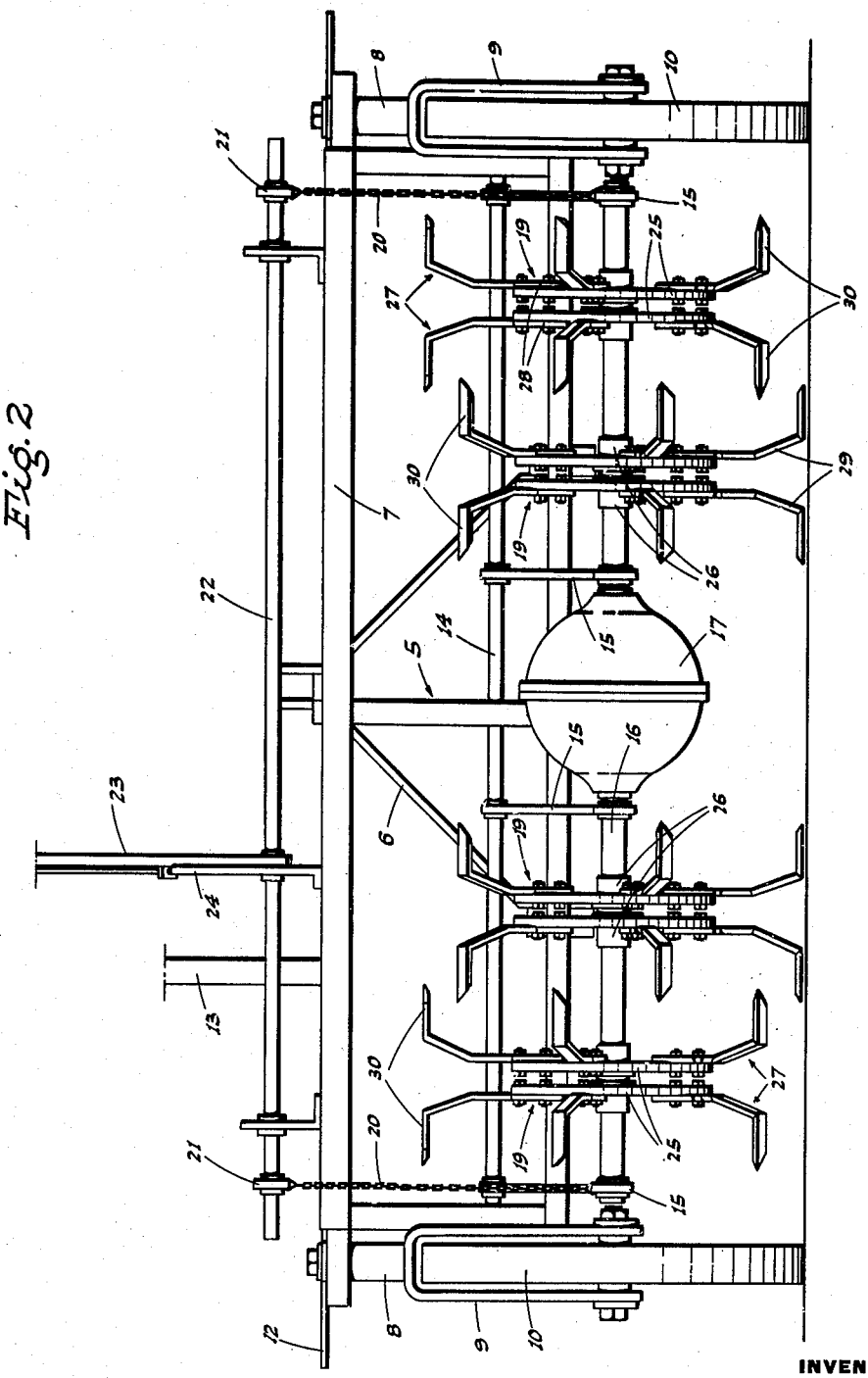

Jan. 31, 1956     E. J. KLEPPE     2,732,785
ROTARY BLADE CULTIVATOR
Filed April 17, 1951     3 Sheets—Sheet 3
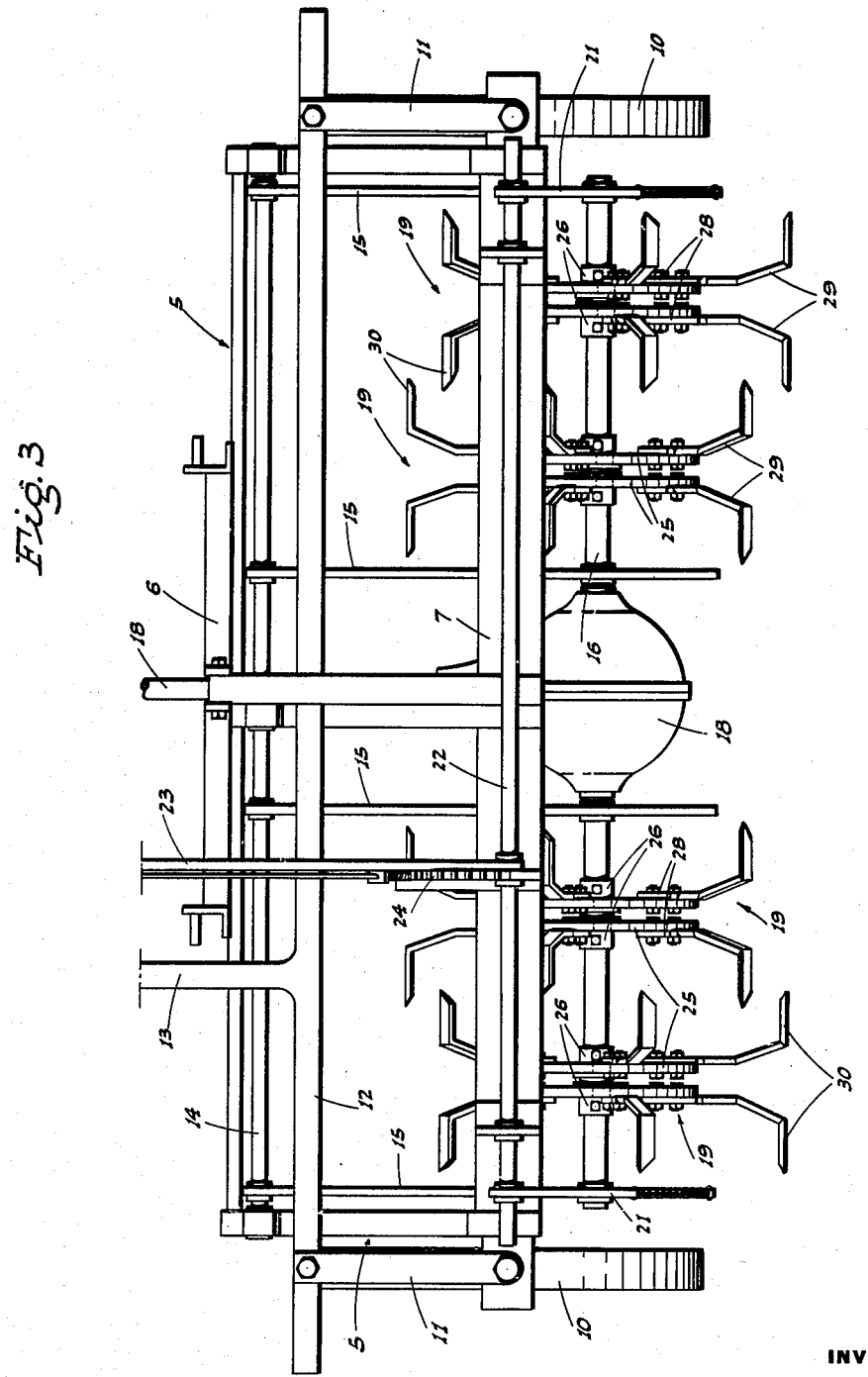
INVENTOR
Ernest J. Kleppe
BY
ATTORNEYS United States Patent Office 2,732,785
Patented Jan. 31, 1956

2,732,785

ROTARY BLADE CULTIVATOR

Ernest J. Kleppe, Reno, Nev.

Application April 17, 1951, Serial No. 221,483

1 Claim. (Cl. 97—212)

This invention relates in general to a rotary type cultivator for use to weed and condition the soil along row-planted crops.

The principal object of this invention is to provide a novel power driven, blade type rotary cultivator unit adapted to work along a crop row, weeding and cultivating on opposite sides thereof but without injury to the plants or their roots.

It is a further object of the invention to provide a rotary cultivator unit, as above, which includes axially adjustable mounting discs on a driven cross shaft, standards radiating from said discs in circumferentially spaced relation, and sharpened cultivating blades—of novel form—extending from such standards.

A separate object of this invention is to provide a novel, wheel supported mount for a plurality of the rotary cultivating units in side by side relation, whereby a corresponding number of crop rows may be cultivated with each pass of the implement across the field.

An additional object is to provide a rotary blade cultivator which is operative to weed, break crusts, and cultivate in an effective manner and without plant damage, regardless of whether the soil is dry, wet, or clodded, and under conditions where the soil has trash or debris therein.

Another object of the invention is to provide a rotary blade cultivator which is designed for ease and economy of manufacture.

Still another object of the invention is to provide a practical and reliable rotary cultivator, and yet one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the rotary blade cultivator as connected in draft relation to an agricultural tractor of wheel type.

Fig. 2 is a rear end elevation of the cultivator.

Fig. 3 is a plan view of the same.

Fig. 4 is an enlarged perspective view of one of the cultivator blades detached.

Figs. 5 and 6 are similar views, but show modifications of the cultivator blade.

Referring now more particularly to the characters of reference on the drawings, the rotary blade cultivator is in the form of an implement adapted to be coupled in draft relation at the rear of a wheel type agricultural tractor, indicated generally at 1, which tractor includes a hitch 2; the latter being comprised of transversely spaced draft arms 3 and a central top link 4.

The implement comprises a transversely extending main frame, indicated generally at 5, and fitted at the front with an upstanding A-frame 6 adapted to be coupled at corresponding points to the draft arms 3 and top link 4.

At the top and rear thereof the transverse main frame 5 includes a transverse top beam 7, and spindles 8 are journaled in connection with, and depend from, opposite end portions of said top beam. The spindles 8 are formed, at their lower ends, with forks 9 in which wheels 10 are journaled.

The upper ends of the spindles 8 are fitted with forwardly projecting, radial steering arms 11, and a transverse bar 12 is pivotally connected to, and extends between, said steering arms; there being a forwardly and upwardly projecting steering handle 13 on the bar 12. The handle 13 is within reach of the tractor operator and is adapted to be manipuated whereby to transversely shift the bar 12 and produce such steering of the wheels 10 as may be necessary to cause the implement to properly track relative to the crop rows being cultivated.

The main frame 5 is fitted, in the forward lower portion thereof, with a cross shaft 14, and a plurality of mounting arms 15 are secured to, and extend downwardly and rearwardly from, said cross shaft.

Adjacent but short of their rear ends the mounting arms 15 serve as the support for another cross shaft 16 which extends through a central gear box 17, being driven from the power take-off shaft of the tractor by means of a rearwardly extending drive shaft 18 which leads into the gear box 17.

The cross shaft 16 is fitted, beyond each side of the gear box 17, with a plurality of rotary cultivator units, each of which is indicated at 19, and which will hereinafter be described in detail.

The assembly of the mounting arms 15, cross shaft 16, and rotary cultivator units 19 is selectively vertically adjustable by means of lift chains 20 which extend upwardly from the rear of the endmost mounting arms 15. At their upper ends the lift chains 12 connect to radial arms 21 projecting rearwardly from a cross shaft 22 journaled on top of the beam 7. The cross shaft 22 is adapted to be rotated by an upstanding hand lever 23, the latter normally being releasably latched to a notched quadrant 24. By adjusting the hand lever 23 the effective working depth of the rotary cultivator units 19 is determined.

As all of the rotary cultivator units 19 are of identical construction—each being adapted to work along a corresponding crop row—a description of one such unit will suffice for all.

Each rotary cultivator unit 19 comprises a pair of radial mounting discs 25 secured on the cross shaft 16, in axially adjustable relation, by means including hubs 26. The spacing of the discs 25 is initially determined by the size of the plants in the crop row to be cultivated.

Each radial mounting disc 25 is fitted with a plurality of circumferentially spaced, radially outwardly projecting cultivator blades, indicated generally at 27; the corresponding blades on the different discs 25 being circumferentially staggered to prevent clods or debris from jamming between the blades and then turning to damage plants in the plant row; the plants being centered beneath the discs 25 and between the cultivator blades 27 as the implement advances.

Each cultivator blade 27 comprises an attachment shank 28 which merges with an outwardly canted blade part 29, and in turn the latter merges with a laterally outwardly projecting blade part 30 disposed parallel to the axis of rotation. The outer end portion of the shank 28, together with the blade parts 29 and 30, are sharpened on their leading edges, as shown.

The rotary cultivator units 19, each spanning a crop row, are driven in a direction so that such units turn downwardly at the front and rearwardly at the bottom; the blades 27 effectively weeding, mulching, and cultivating along opposite sides of such crop row, yet without injury to the plants or their roots. The laterally outward divergence or canting of the blade parts 29 assures that any existing crust, clods, or embedded debris is effectively cut or chopped, and thrown rearwardly between the crop rows, yet without root damage.

In addition to the staggering of the blades 27 on each rotary cultivator unit 19, the corresponding blades of adjacent units are likewise staggered, whereby to prevent them from running too close together, particularly as they are set lapping in their paths of rotation.

In Fig. 5 there is illustrated a modified form of cultivator blade, indicated generally at 31. Here the blade comprises an attachment shank 32 formed at its outer end with a vertical cutter plate 33 which projects forwardly, i. e. in the direction of rotation; the outermost edge of said vertical cutter plate 33 being arcuate and sharpened, as at 34.

A cultivator blade 35, sharpened on its leading edge as at 35a, projects laterally outwardly from the heel of said cutter plate 33.

With this form of the blade the cutter plate 33 first slices or shears through the surface of the soil alongside the crop row whereby when the cultivator blade 35 passes, there is no tendency to disturb, break, or tear away the soil about the roots of the plant. This is an important feature.

In Fig. 6 there is another modification of the blade; the latter being here indicated generally at 36, and including, as in Fig. 5, a shank 37; a cutter plate 38; and a horizontally and laterally outwardly projecting cultivator blade 39. Here, however, the cutter plate 38 is formed with a radially outermost portion which is inclined or canted, as at 40, toward the blade 39; the latter projecting from the heel of said canted portion 40. This embodiment of the invention functions in the same manner as that shown in Fig. 5, except that the canted part 40 affords relief immediately alongside the crop row below the surface and in the plane of the roots, whereby to protect the latter against damage.

The above described rotary blade cultivator provides a very practical and reliable implement for the intended purpose; such cultivator working effectively and positively to cultivate, simultaneously, along opposite sides of a plurality of adjacent crop rows.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A blade unit for a rotary cultivator comprising a shank extending radially of the axis of the cultivator, a vertical cutter plate on the outer end of the shank, said plate extending ahead of the shank in the direction of rotation of the cultivator and being rearwardly rounded and sharpened on its forward and lower soil engaged edge, and a cultivator blade projecting laterally out from the heel of the plate and being sharpened along its leading edge; said blade being of relatively small bar-like form in cross section.

References Cited in the file of this patent

UNITED STATES PATENTS

| | | |
|---|---|---|
| 821,815 | Muirheid | May 29, 1906 |
| 1,025,961 | Clark | May 14, 1912 |
| 1,699,151 | Miller et al. | Jan. 15, 1929 |
| 1,896,391 | Chong et al. | Feb. 7, 1933 |
| 2,046,046 | Washington | June 30, 1936 |
| 2,168,733 | Dufour | Aug. 8, 1939 |
| 2,279,652 | Beard | Apr. 14, 1942 |
| 2,287,479 | Kelsey | June 23, 1942 |
| 2,341,830 | Uddenborg | Feb. 15, 1944 |
| 2,477,662 | Seaman | Aug. 2, 1949 |
| 2,520,229 | Trauger | Aug. 29, 1950 |
| 2,583,571 | Howe | Jan. 29, 1952 |

FOREIGN PATENTS

| | | |
|---|---|---|
| 22,829 | Norway | Dec. 2, 1912 |
| 141,747 | Great Britain | Mar. 10, 1921 |
| 384,813 | Germany | Nov. 6, 1923 |
| 104,892 | Australia | Aug. 22, 1938 |